March 17, 1953 P. HODSON 2,631,870
REGENERATIVE HEATER SEAL BIASED
BY CIRCUMFERENTIAL SPRING
Filed Oct. 15, 1949
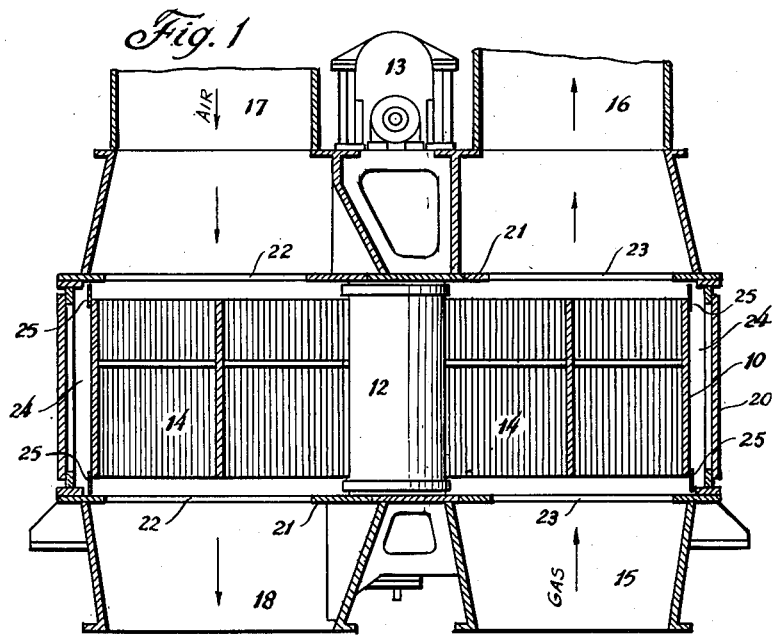
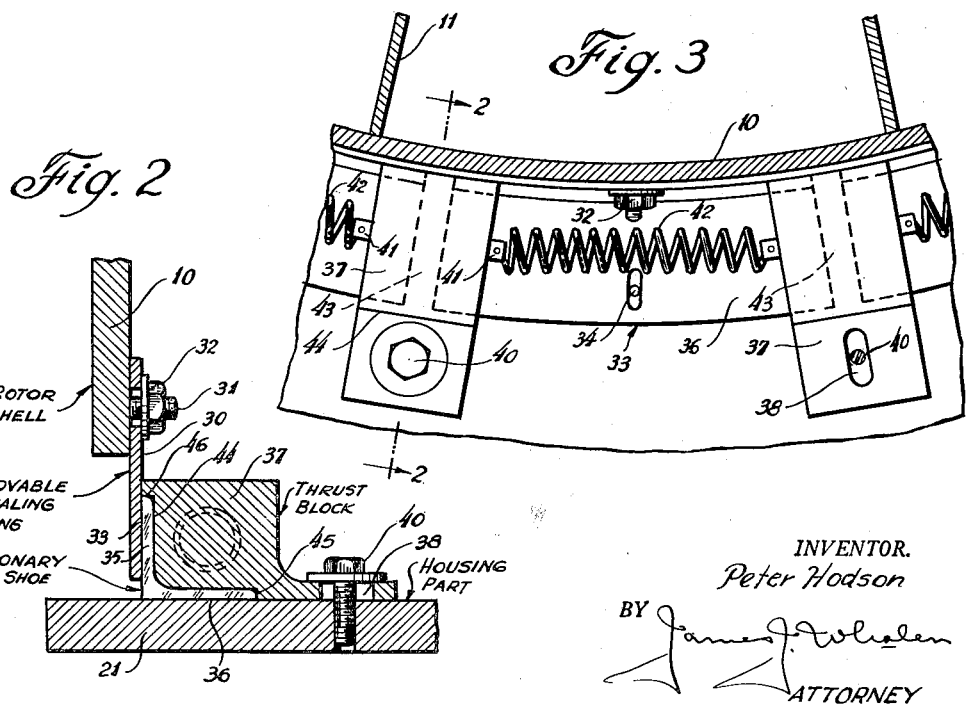
INVENTOR.
Peter Hodson
BY
ATTORNEY Patented Mar. 17, 1953

2,631,870

UNITED STATES PATENT OFFICE 2,631,870

REGENERATIVE HEATER SEAL BIASED BY CIRCUMFERENTIAL SPRING

Peter Hodson, Wellsville, N. Y., assignor to The Air Preheater Corporation, New York, N. Y.

Application October 15, 1949, Serial No. 121,566

8 Claims. (Cl. 285—96.1)

1

The present invention relates to heat exchangers and particularly to improved circumferential seals for use between the rotor and enclosing housing of a rotary regenerative air preheater or like apparatus.

A rotary regenerative heater of the Ljungstrom type has a cylindrical rotor with compartments carrying metallic heat transfer plates which as the rotor turns are first exposed to the heating gases and then disposed in the air passage to impart the absorbed heat to the air. The rotor is surrounded by a housing having end or sector plates formed with openings to provide for the flow of gas and air and in order to preclude the flow of gas or air through the clearance space between the rotor and housing without passing over the heat transfer material it is customary to provide the rotor with circumferential seals that bear against the sector plates or other stationary parts.

The present invention contemplates a segmental seal made up of a number of arcuate sealing shoes held yieldingly against the outer side face of the rotor adjacent either end.

In the drawings:

Figure 1 is a sectional elevational view in diagrammatic form of a rotor regenerative air preheater.

Figure 2 is a fragmentary view on an enlarged scale as viewed in the line 2—2 in Figure 3 illustrating the circumferential seal between the rotor and the end plates as constructed in accordance with the present invention; and Figure 3 is a fragmentary plan view, partly sectioned, corresponding to Figure 2.

In the drawings the numeral 10 designates the cylindrical shell of a rotor which is divided into sector shaped compartments by radial partitions 11 connecting it with the rotor post 12 which is driven by a motor and reduction gearing 13 to turn the rotor slowly about its axis. The rotor compartments contain regenerative heat transfer material in the form of metallic plates 14 which first absorb heat from hot gases entering the preheater through a duct 15 from a boiler or other source to be discharged after passing over the heat transfer plates 14 through an outlet duct 16 to which an induced draft fan (not shown) is connected. As the rotor turns slowly about its axis, the heated plates 14 are moved into the stream of air admitted through the duct 17 to which a forced draft fan (not shown) is connected. After passing over the plates 14 and absorbing heat therefrom the stream of air is conveyed to the boiler furnace or other place of use through duct 18. A housing 20 enclosing the rotor 10 is provided at either end opposite the latter with end or sector plates 21 which are apertured at 22 and 23 to permit streams of gas and air to enter and leave the preheater.

In order that the streams of gas and air may not by-pass the heat transfer surface 14 by flowing in the annular clearance space 24 between the rotor shell 10 and the housing 20 it is customary to provide on the shell 10 circumferential seals diagrammatically shown at 25 in Fig. 1, which wipe against the sector plates 21 or allied parts so as to seal off the space 24 at both ends of the rotor.

In accordance with the present invention the rotor shell 10 is provided around its upper and lower end edges with metallic sealing rings 30 extending completely around the perimeter of the rotor. These rings may be segmental. In the form illustrated in Figure 2 the sealing ring 30 projects beyond the end of the rotor and is adjustably mounted thereon by means of the bolts and nuts 31, 32 so that it may be adjusted axially toward and away from the end plates 21. Bearing against the sealing rings 30 at the ends of the rotor are the sealing shoes 33 each of which constitutes a segment of the relatively stationary sealing ring mounted on the sector plate 21 and forming a complete circle adjacent the rotor shell 10 around its upper and lower ends.

In the construction shown the sealing shoes 33 are in the form of angle irons both of whose legs 35, 36 are received in correspondingly shaped recesses in the bottom and inner end faces of thrust blocks 37 mounted on the sector plate 21 in circumferentially spaced relation around the rotor closely adjacent to the latter as illustrated. The thrust blocks 37 are formed with slots 38 through which bolts 40 extend into the end plates 21 to guide the thrust blocks in radial movement toward and away from the rotor shell. A stud 34 on the sector plate 21 extends into a slot in the base leg 36 of each angle shaped sealing shoe 33. The side faces of the thrust blocks 37 are provided with apertured lugs 41 to which are attached coil springs 42 that physically interconnect contiguous thrust blocks to each other and act like a garter spring to narrow the circle throughout which the thrust blocks are disposed so that the latter are urged inwardly in radial directions to press the segmental sealing shoe 33 into contacting relation with the sealing ring 30 on the rotor shell.

The gaps 43 between the opposed ends of the adjacent sealing shoes 33 are sealed against gas or air leakage in a radial direction by being overlapped by the surface 44 of the recess in the inner end face of the thrust blocks as well as by the surface 45 at the outer end of the recess in the base, the surface 45 being in effect a continuation of the surface 44. Leakage in an axial direction through the gaps 43 is prevented by overlapping of the ends of contiguous seal shoes 43 by the surface 46 at the upper end of the recess in the inner end faces of the thrust blocks.

What I claim is:

1. An improved circumferential seal for use in apparatus having a rotor that carries material to be contacted by gaseous fluids, and a housing surrounding the rotor and provided with end plates extending across the rotor and formed inlets and outlets for admitting fluids for circulation through the rotor, said improved circumferential seals for confining the flow of the fluids to paths through the rotor and obviating axial flow in the space between the rotor and housing comprising; a ring providing a smooth sealing surface; a plurality of arcuate sealing shoes together forming an annular sealing member mounted in a position opposite the sealing ring; thrust blocks spaced at intervals circumferentially of said member adjacent the latter; means slidably supporting said blocks for radial movement toward and away from said sealing shoes; and spring means connecting contiguously positioned thrust blocks to each other and acting thereon to urge them into contact with said sealing shoes for pressing the latter yieldingly against said sealing ring.

2. An improved circumferential seal for a rotary air preheater or like apparatus comprising; a ring providing a smooth sealing surface; a plurality of arcuate sealing members positioned in a circle radially outward of the sealing surface on said ring; a plurality of thrust blocks spaced at intervals circumferentially about and engaging said arcuate sealing members; a support on which said arcuate sealing members and thrust blocks are mounted for individual independent sliding movement toward and away from said ring; and spring means joining contiguously positioned thrust blocks to each other and acting thereon to urge them into contact with said sealing members for pressing the latter yieldingly against said sealing ring.

3. An improved circumferential seal for a rotary air preheater or like apparatus comprising; a vertically disposed, annular ring providing a smooth sealing surface; a plurality of arcuate sealing members positioned in a circle opposite the sealing surface on said ring; a plurality of thrust blocks spaced at intervals circumferentially about and engaging said arcuate sealing members; a horizontally disposed support on which said arcuate sealing members and thrust blocks are mounted for individual independent sliding movement toward and away from said ring; and means interconnecting said thrust blocks and acting thereon to urge the latter in a radial direction for maintaining said arcuate sealing members in contact with said sealing ring.

4. Sealing devices as recited in claim 3 wherein lugs are formed on the radially extending side faces of said thrust blocks; and coil springs anchored to the lugs of contiguous blocks for biasing them radially inward toward said sealing ring.

5. A sealing device as defined in claim 3 wherein said arcuate sealing members comprise a series of angle members with the outer face of one leg thereof engaging said ring while said thrust blocks are mounted between the leg parts comprising the angle of said member in contact with the latter.

6. Sealing devices as defined in claim 3 in which said thrust blocks are so positioned circumferentially of said sealing members as to overlap the adjacent ends of contiguous sealing members so as to seal any gaps therebetween.

7. Sealing devices as defined in claim 3 in which said sealing members are in the form of arcuately bent angle members with one leg thereof contacting said supporting means and the other leg engaging said ring and the bottom and end faces of said thrust blocks are correspondingly recessed to receive said angle shaped members.

8. Sealing devices as recited in claim 7 wherein said thrust blocks are positioned to overlap the adjacent ends of contiguous sealing members so that any gaps between the latter are sealed both in axial and radial directions by disposition of said sealing member ends in the recesses of said thrust blocks.

PETER HODSON.

REFERENCES CITED

The following references are of record in the file of this patent:

UNITED STATES PATENTS

| Number | Name | Date |
|---|---|---|
| 1,331,360 | Parsons et al. | Feb. 17, 1920 |
| 1,331,522 | Parsons et al. | Feb. 24, 1920 |
| 1,902,792 | Warner | Mar. 21, 1933 |
| 2,460,746 | Guthrie et al. | Feb. 1, 1949 |
| 2,471,995 | Yerrick et al. | May 31, 1949 |